Feb. 3, 1970  D. J. BOZICH  3,493,244
COLLAPSIBLE ASSEMBLY
Filed March 14, 1968
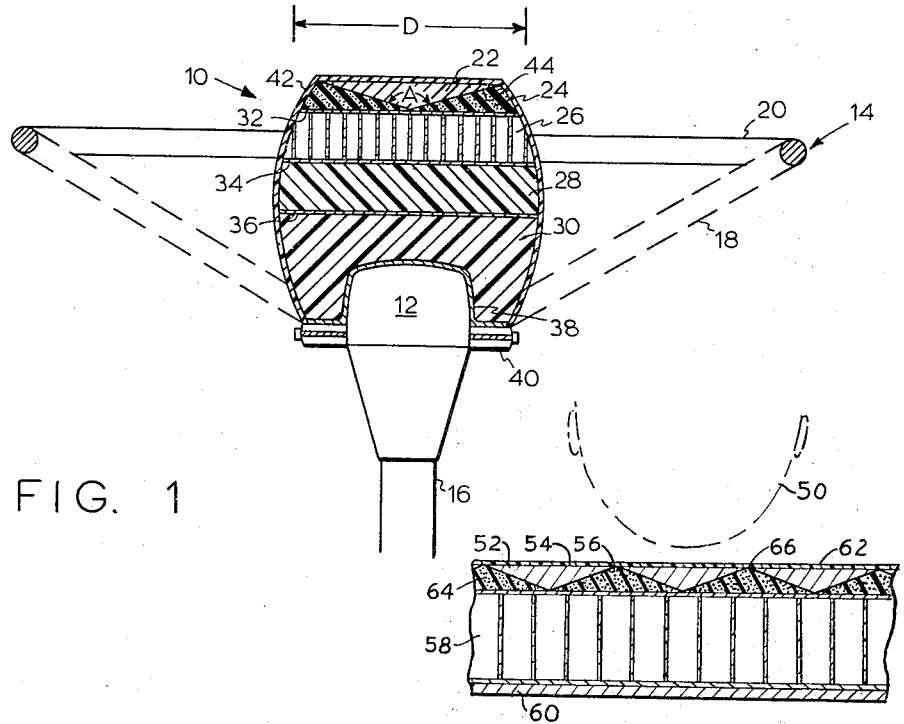
FIG. 1
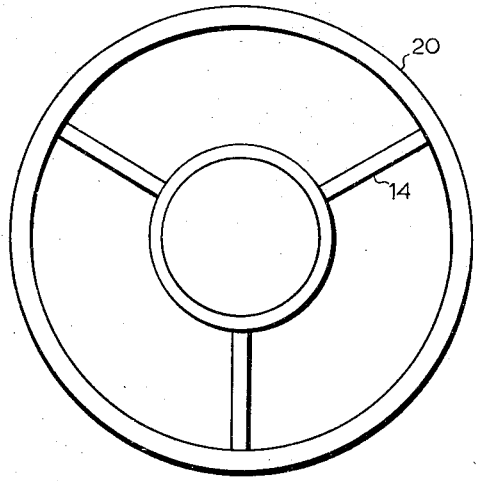
FIG. 3
FIG. 2
INVENTORS
DANIEL J. BOZICH
BY Lindenberg & Freilich
ATTORNEYS

United States Patent Office 3,493,244
Patented Feb. 3, 1970

3,493,244
COLLAPSIBLE ASSEMBLY
Daniel J. Bozich, Huntsville, Ala., assignor to Wyle Laboratories, El Segundo, Calif., a corporation of California
Filed Mar. 14, 1968, Ser. No. 713,112
Int. Cl. B60r 21/04, 21/00
U.S. Cl. 280—150                15 Claims

ABSTRACT OF THE DISCLOSURE

A collapsible assembly for absorbing large shocks in a limited collapse thickness to prevent injuries, as when an occupant is thrust forward in an automobile crash. The assembly comprises a top hammer member for receiving the initial blow and a series of collapsible layers below the hammer member for absorbing crash forces. Some of the collapsible layers crush when compressed, so that an almost constant force resists compression throughout the crushing distance. The uppermost layer is constructed of paper honeycomb which is initially very stiff to quickly raise deceleration forces before an appreciable reduction in thickness occurs. The top hammer member has a wedge-shaped bottom surface to penetrate the paper honeycomb and assure an almost constant resistance to crushing through most of the reduction in thickness of the honeycomb layer.

BACKGROUND OF THE INVENTION

Field of the invention

This invention relates to shock absorbing apparatus.

Description of the prior art.

It is well known that a large proportion of injuries resulting from automobile crashes occurs when the body of an occupant strikes a hard portion of the vehicle. In the case of the driver, injuries are likely to occur when he is thrust forward and strikes the steering wheel. If the driver is not wearing a seat belt, his entire body may be thrust forward so that his chest bends or breaks off the rim of the steering wheel and he is "speared" by the hub. In the case of a driver wearing a lap-type seat belt, his upper torso can still move forward and result in his upper chest portion or even his head striking the hub of the steering wheel. Thus, the hub of a steering wheel is a major cause of driver injuries.

Injuries due to driver impact with the steering wheel hub can be reduced by providing an energy absorber which absorbs the impact in a controlled manner. The impact absorption must be in a manner that limits the maximum pressure or force on the driver's body to a certain level below which serious injury is unlikely to occur. If a cushion of sufficient thickness is provided, the maximum pressure can be held to a low level to substantially reduce hub-caused injuries in even severe crashes.

The thickness of a hub cushion is limited by requirements of modern car design. Typically, modern vehicles have a steering wheel hub which is recessed approximately three inches below the plane of the rim. A hub cushion which protrudes more than a couple of inches above the plane of the rim would tend to interfere with driving. Thus, a hub cushion for use in typical modern vehicles should not be more than on the order of five inches in thickness.

It is extremely difficult to produce an impact-absorbing cushion within the thickness limitations of on the order of five inches. If a single layer of a typical resilient material, such as rubber, is used in a hub cushion, the force on the driver's body rises at a rapid rate with time. In a severe crash, most of the cushion thickness is used to exert a small force which does not greatly slow the body. When the cushion is compressed to a very narrow thickness, very large forces are exerted to stop the still fast-moving body, and severe injuries are likely to occur.

The exertion of small stopping forces during any appreciable reduction in cushion thickness is wasteful of the limited stopping distance. This is because it is generally the maximum level of force and therefore the maximum deceleration exerted on the driver's body, which governs the severity of injury. The maximum utilization of a cushion requires that a stopping force which is large but less than a level which ordinarily causes lethal injury, be applied through nearly the entire reduction in cushion thickness. This must occur particularly in the case of high speed crashes where the force is applied rapidly.

The provision of efficient cushions is important in many applications besides motor vehicles. For example, cargo damage due to extremely rough handling can be reduced if low cost cushions are provided which occupy small space, yet which absorb large shocks.

OBJECTS AND SUMMARY OF THE INVENTION

One object of the present invention is to provide an assembly which collapses in a programmed manner to reduce the severity of damage or injury in crashes.

Another object is to provide an economical cushion of limited thickness which absorbs large shocks.

In accordance with the present invention, there is provided a collapsible assembly which stops fast-moving objects in a limited stopping distance to prevent damage or injury in even high speed crashes. The assembly is constructed to collapse with a high, but limited, resisting force throughout most of its reduction in thickness. As a result, the limited collapse thickness is efficiently utilized to prevent high peak decelerating forces which would otherwise occur during the final deceleration of the protected object.

In accordance with one embodiment of the invention, the assembly utilizes an upper layer of a material such as paper honeycomb which is initially stiff. The stiff material allows very little reduction in thickness during the initial impact. This allows an initial compression of the protected object to provide a rapid onset of deceleration. In the case of an automobile driver, the stiff material compresses the skin and outer layers of the driver's body before appreciable compression of the assembly occurs, to provide a rapid onset of deceleration.

The assembly has several layers of crushable material arranged in series, each of which provides a resisting force of a constant order of magnitude as it crushes. The constant resistance to crushing enables efficient utilization of the crushing thickness, as compared to ordinary resilient materials which do not provide a high resisting force until they are compressed to a small thickness.

The crushable layers are chosen so that some crush more easily than others. The most easily crushed, or weakest layers, are on the bottom of the stack. As a result, a large part of the cushion mass must be moved by the protected object, such as a driver's body, while the weakest layers are being compressed and begin to crush. This absorbs some of the body's momentum and further enables the rapid buildup of resisting forces towards the maximum level before appreciable collapse occurs. As the weakest layer undergoes appreciable reduction in thickness, its resisting force rises somewhat. As a result, the next layers begin to crush until, in a severe crash, the entire cushion has crushed to a small thickness.

The top layer, which is of an initially stiff material such as paper honeycomb, begins to crush after the other layers have already crushed to a considerable extent. However, because of a stiff construction, it is often difficult to accurately predict at what force level crushing of the honeycomb will occur or whether the crushing will thereafter continue with a substantially constant resisting force. To assure a predictable collapse, a hammer section is provided at the top of the collapsible assembly, which has a wedge-shaped bottom bearing against the honeycomb layer. The wedge shape assures initial penetration of the honeycomb when a predetermined resisting force is reached. It also assures a substantially constant resisting force during collapse of the honeycomb.

In one application of the invention, the lower end of the cushion is especially adapted for fitting on the steering wheel hub of a vehicle. The cushion has a wide hammer at its upper end and three impact-absorbing layers between the hammer and lower end. The bottommost impact-absorbing layer is constructed of fiberglass batting, the middle layer is constructed of Styrofoam, and the uppermost layer is constructed of paper honeycomb. The bottom of the hammer is wedge-shaped, with the point of the wedge bearing against the top of the honeycomb layer. A bed of foam rubber supports the outer portions of the hammer on the honeycomb layer. The assembly exerts a large resisting force throughout nearly its entire collapse distance, even in severe crashes when the force is applied suddenly. However, the high resisting forces never exceed a preset level at which lethal injuries are likely to occur, until the cushion is collapsed to a very small thickness.

BRIEF DESCRIPTION OF THE DRAWINGS

FIGURE 1 is a sectional side view of a cushion constructed in accordance with the invention shown mounted on an ordinary steering wheel hub;

FIGURE 2 is a plan view of the cushion of FIGURE 1; and

FIGURE 3 is a sectional side view of another embodiment of the invention.

DESCRIPTION OF THE PREFERRED EMBODIMENTS

FIGURE 1 illustrates one example of a collapsible assembly, which is an impact-absorbing cushion assembly 10 mounted on the hub 12 of a vehicle steering wheel 14. The steering wheel comprises a post 16 which supports the hub 12, and a plurality of spokes 18 radiating upwardly and outwardly from the hub. A rim 20 attached to the outer end of the spokes encircles the hub.

The cushion assembly 10 comprises a wedge-shaped hammer 22 for receiving the chest or other part of the body in a crash, and a series of shock-absorbing layers for reducing the speed at which the body approaches the hub 12. The impact-absorbing layers include a bed 24 of foam rubber, a layer 26 of resin-impregnated paper honeycomb, another layer 28 of Styrofoam, and still another layer 30 of fiberglass batting. The honeycomb layer 26 has elongated cells oriented with their lengths parallel to the thickness of the cushion. Thin discs of aluminum 32, 34, and 36 separates the impact-absorbing layers from each other, and a bottom anvil plate 38 is provided which conforms to the surface of the hub 12. A mounting ring 40 attached to the anvil plate enables the secure attachment of the cushion assembly to the hub. A vinyl covering 42 covers the cushion.

The three primary impact-absorbing layers 26, 28, and 30 are of different collapse-resistant natures. The layer 30 of fiber glass batting is relatively weak during initial compression and is more like typical resilient materials than the other layers. However, it achieves a high resistance to further crushing at perhaps a 20% decrease in thickness, and further increases in resistance are not as great as would be the case with typical resilient materials. The Styrofoam layer 28 has a resistance to compression which initially rises rapidly with decrease in thickness as the material approaches its elastic limit. Thereafter, the Styrofoam cells collapse and resistance to further thickness reduction does not rise at a rapid rate. The paper honeycomb layer 26 is initially very stiff so that its resistance rises to a very high level during the first few percent of decrease in thickness. After a certain level is reached, however, the honeycomb layer begins to crush. When crushing begins, the resistance to thickness reduction suddenly decreases to approximately one half the maximum level reached just prior to crushing. This resistance level is maintained substantially constant throughout the crushing thickness.

The hammer 22 serves to receive the initial impact and to transmit it to the honeycomb layer. The hammer has a wedge-shaped bottom 44 which allows it to penetrate into the honeycomb after a predetermined resisting force is reached. Such a force is reached only after the fiber glass layer 30 and styrofoam layer 28 have undergone an appreciable reduction in thickness. When the wedge-shaped hammer 22 penetrates the honeycomb layer 26, the honeycomb crushes with a substantially constant resistance. In the absence of a wedge-shaped hammer, crushing of the honeycomb would be unpredictable, and might require an extremely high force at some points of the crushing, particularly at the initial stages. The wedge shape provides a concentration of force which assures crushing at moderate force levels. The bed 24 of foam rubber is included to absorb the many shocks encountered in everyday use.

Each of the three crushable layers 26, 28, and 30 is composed primarily of gas or air pockets whose walls can be broken to collapse the layer, particularly in the case of the two uper layers 28 and 30. As a crushable layer is compressed (past the initial elastic range), small portions of the material resist compression until their elastic limit is reached, at which point they collapse, and resistance falls to nearly zero. At this point, the force must be resisted by the next small portion of the material, where a similar destruction occurs. Since each of the small crushable portions can have nearly the same strength, the entire layer can be crushed without a greatly increased resistance between the beginning and end of compression of the layer. The resistance is on the same order of magnitude throughout a majority of its reduction in thickness. The crushable construction, which enables most of the volume of the material to be occupied by air pockets, provides a space for receiving the crushed material. This allows a compression to a very small volume before resistance increases to an extremely high level.

A better understanding of the function of the hub cushion can be gained by considering its operation during a severe crash. When a severe crash occurs, such as a headon crash at 50 feet per second (34 miles per hour), the driver's upper torso may move forward and strike the hub cushion. Generally, it will strike the cushion at a lower speed than that of the vehicle, such as 20 feet per second. The impact will typically be between the upper chest area of the driver and the hammer 22 of the cushion. The force on the hammer is applied to the honeycomb layer which undergoes very little compression. The impact force is then transmitted through the Styrofoam layer 28 which also undergoes very little compression, and finally to the fiber glass layer 30.

In the course of accelerating the hammer 22, the honeycomb layer 30, and much of the Styrofoam layer 28, large forces are applied to the driver's body. These large forces serve mainly to compress the outer layers of the driver's body, including his skin, without appreciably slowing the inner organs. Thus, as the fiber glass layer is compressed, the driver's body and all of the upper layers of the cushion reach a large compressive force.

Appreciable compression of the fiber glass occurs, and it increases until an approximately 50% reduction of thickness is reached. At this point, its resistance rises to a high enough level that the Styrofoam layer begins to undergo appreciable collapse.

Both the fiber glass layer 30 and the styrofoam layer 28 continue to collapse until the styrofoam layer has undergone an approximately 70% reduction in thickness. At this point, the honeycomb layer 26 begins to crush, by reason of penetration of the wedge-shaped hammer 22 into the honeycomb layer. Crushing of the honeycomb layer occurs while the fiber glass and Styrofoam layers undergo a small final reduction in thickness. Finally, all three layers 26, 28, and 30 have been crushed to a small thickness, such as 10% of their original thickness. If the crash is too severe, the driver's body still will not be stopped, and extremely high forces will be exerted by the cushion. However, in a moderately sever crash, the driver's body will have been stopped before such high levels are reached.

The forces exerted on the driver are not constant throughout the collapse of the cushion. However, they immediately rise to a moderately high level and rise only a relatively small amount beyond the initial high level before complete collapse occurs. The appreciable, but relatively small change in resisting force between initial collapse and final programmed collapse is helpful in reducing the severity of injuries in minor crashes. In minor crashes, only the fiber glass and/or the Styrofoam will undergo appreciable reduction in thickness. Accordingly, the highest force on the body can be held below a level which is likely to result in any injury at all. In severe crashes, the highest level may be high enough to prevent lethal injuries, but may still be high enough to cause some injuries. Thus, the cushion not only prevents lethal injuries in severe crashes, but can prevent any injury in minor crashes.

The hammer section 22 is generally constructed of a hard material such as a hard plastic. The bottom portion 44 is preferably convex to enable controlled penetration of the honeycomb. However, it can have a variety of shapes besides a simple wedge shape. For example, the wedge may be of a pyramid shape to provide two planes of cleavage, or may even be of conical shape. The angle of the wedge is chosen to control the collapse of the honeycomb. The sharper the angle, the more rapid the collapse of a honeycomb layer of given strength. It is generally preferable to provide a large angle A so that the hammer section is not thick, and therefore does not waste the limited thickness of the cushion. Typical dimensions of the cushion are a diameter D of six inches, and a total thickness between the top of the hub 12 and the top of hammer 22 of five inches. In such an arrangement, the honeycomb and Styrofoam layers 26 and 28 may each be 1½ inches thick, the thinnest part of the fiber glass batting layer 30 may be 1¼ inches, and the hammer 22 may have a maximum thickness of three-quarters inch.

The choice of strengths of the impact-absorbing layers depends upon the maximum resisting forces which are to be employed. Typically, the materials are chosen to provide a pressure of between 25 and 50 pounds per square inch on the driver's chest during collapse. At the lower level of pressure of 25 p.s.i., serious injuries are generally avoided, while at the upper level of 50 p.s.i., lethal injuries are generally avoided. The cushion is constructed to provide these pressures for a part of the driver's body which weighs on the order of 40 pounds, which is approximately the weight of the head, neck, and middle chest area of the average driver. The objective is to provide a maximum deceleration (for appreciable times) of no more than 20 g's in even relatively severe crashes up to approximately a 26 foot per second impact velocity.

When the driver's chest strikes the hammer 22, the pressure on the chest is generally evenly distributed. However, if the head of the driver strikes the hammer 22, large concentrations of force are likely to result. It is generally unlikely for the head of the driver to strike the hub, unless he is very short. If it is desired to provide for this eventuality, an additional layer of perhaps ½ inch of soft wood or the like can be mounted on top of the hammer to help distribute forces.

Cushions have been constructed and tested in crashes using dummies, with the results recorded by motion picture cameras and deceleration-indicating instruments. Cushions constructed in accordance with the above example have been found to provide rapid onsets of deceleration and moderately high sustained decelerations without extremely high sustained peaks.

FIGURE 3 illustrates another embodiment of the invention, utilized as a dashboard cushion placed over a dashboard plate on a motor vehicle to protect the head 50 or other body portions of an occupant. The collapsible assembly of FIGURE 3 comprises hammer means in the form of a mosaic of hammer sections 52, each section having a flat upper surface 54 and a pyramid-shaped bottom surface 56. A layer 58 of honeycomb material is positioned between the hammer section and the dashboard plate 60. A vinyl covering sheet 62 covers the mosaic hammer sections to provide a continuous dashboard surface. Filler material 64 such as foam rubber lies between the honeycomb layer and portions of the hammer sections.

The individual hammer sections 52 are independent of each other, being unjoined or joined only by a thin, easily broken strip 66 where they are adjacent to each other. As a result, objects or body portions of small area which strike the dashboard, such as the front of an occupant's head, collapse only the area of honeycomb under one hammer section. Larger areas such as the chest of an occupant may collapse portions of the honeycomb layers under several hammer sections, and they are slowed with a greater resisting force. Since the chest area also has a greater mass, the larger resisting force results in approximately the same deceleration as for the head which strikes only one hammer section. Thus, the utilization of a mosaic of small hammer sections tends to equalize deceleration for large and small objects.

The hammer sections 52 prevent substantial collapse until a moderately large force is reached. They then assure a controlled collapse of the honeycomb layer, preventing excessively high initial deceleration. The prevention of excessively high initial deceleration by the hard convex hammer sections is useful in conjunction with other collapsible materials besides honeycomb.

It should be understood that the collapsible assemblies of the present invention can be utilized in numerous applications in addition to protecting occupants in automobile crashes. For example, equipment which may be dropped by parachute or which may be subjected to other extremely rough handling can be protected by collapsible assemblies of limited thickness and weight constructed in accordance with the invention.

Although particular embodiments of the invention have been described and illustrated herein, it is recognized that modifications and variations may readily occur to those skilled in the art, and consequently it is intended that the claims be interpreted to cover such modifications and equivalents.

What is claimed is:
1. A collapsible assembly comprising:
anvil means;
hammer means spaced forward of said anvil means for receiving impact forces; and
a plurality of impact-absorbing layers disposed in series between said anvil and hammer means, each of said layers including means for resisting thickness reduction with a resisting force which is different from the other layers and which for each layer has the same order of magnitude throughout a majority of its reduction in thickness, whereby said layers collapse successively under impact, said hammer means having a surface adjacent to said plurality of impact absorbing layers shaped for penetration of said layers.

2. A collapsible assembly as defined in claim 1 wherein:
a plurality of said layers is constructed of material which crushes in compression.

3. A collapsible assembly as defined in claim 1 wherein:
said hammer means includes a convex bottom surface facing said anvil means, for penetration of a first of said impact-absorbing layers in a controlled manner.

4. A collapsible assembly as defined in claim 1 wherein:
at least one of said impact-absorbing layers is constructed of a multiplicity of elongated cells of stiff material, with the cells extending substantially parallel to the thickness of the assembly.

5. A collapsible assembly as defined in claim 4 wherein:
said hammer means has a substantially pointed bottom are for penetration into said elongated cells to collapse them during impact-absorption.

6. A collapsible assembly as defined in claim 1 wherein:
a first of said layers has an initial resistance to substantial reduction in thickness of a first predetermined magnitude and a second of said layers disposed between said first layer and said anvil means has a second predetermined resistance to appreciable reduction in thickness of a magnitude substantially less than said first magnitude.

7. A collapsible assembly for absorbing impact forces comprising:
anvil means;
hammer means having an upper surface for receiving impact forces and means defining a convex lower surface area; and
a plurality of layers of impact-absorbing material disposed beneath said lower surface of said hammer means, for enabling penetration by said convex lower surface of said hammer means into one of said layers, each of said layers having a different collapsible resistance for enabling a successive collapse thereof in response to impact by said hammer means.

8. A collapsible assembly as defined in claim 7 wherein:
said hammer means comprises a mosaic of individual hammer sections, each hammer section having a convex lower surface, and each hammer section disposed on a different area of one of said layers of impact-absorbing material.

9. A collapsible assembly as defined in claim 7 wherein:
a majority of the volume of each said layer of impact-absorbing material is comprised of air pockets surrounded by walls of rigid material, whereby to enable crushing to provide a substantially constant order of magnitude of resisting force.

10. A collapsible assembly as defined in claim 7 wherein:
one of said layers of impact-absorbing material comprises a material of substantially rigid honeycomb construction, with elongated cells oriented substantially parallel to the thickness of the cushion, whereby to provide initial stiffness and also crushability.

11. A collapsible assembly as defined in claim 7 wherein:
one of said layers of impact-absorbing material comprises a first material constructed to initially resist crushing with a first resisting force, and including
a second layer disposed between said layer of a first material and said anvil means, said second layer comprising material which initially resists crushing with a second resisting force which is substantially less than said first resisting force, whereby to enable appreciable compression of said second layer prior to appreciable compression of the other layer.

12. A collapsible assembly as defined in claim 7 wherein:
said layers of collapsible material comprise a first material which initially resists compression with a predetermined high resistance force during a thickness reduction of several percent and which resists compression thereafter with a substantially smaller resistance force; and including
a second layer disposed between said layer of a first material and said anvil means, said second layer comprising material which initially crushes upon the application of forces less than said predetermined high resistance force.

13. A cushion for application on the post of a steering wheel assembly comprising:
anvil means for attachment to said post;
a first layer of impact-absorbing material;
a second layer of impact-absorbing material disposed on a side of said first layer;
a third layer of impact-absorbing material disposed on a side of said second layer and also disposed on said anvil means; and
a hammer means for receiving impact forces disposed on said first layer; the surface of said hammer means opposite said first layer being shaped for controlled penetration of said first layer;
said third layer being constructed to undergo a majority reduction in thickness while said second layer undergoes a smaller proportional reduction in thickness than said third layer and said first layer undergoes a smaller proportional reduction in thickness than said second layer, when the same compressing force is applied to all three of said layers.

14. A cushion as defined in claim 13 wherein:
each of said layers is constructed of crushable material, whereby to provide a substantially constant order of magnitude of resisting forces throughout a majority of thickness reduction.

15. A cushion as defined in claim 13 wherein
said means for receiving impact forces comprises hammer means having a convex lower surface for the controlled compression of said first layer.

References Cited

UNITED STATES PATENTS

| | | | |
|---|---|---|---|
| 2,778,761 | 1/1957 | Frieder | 161—404 |
| 3,016,764 | 1/1962 | Fredericks | 74—552 |
| 3,087,352 | 4/1963 | Daniel | 74—552 |
| 3,224,924 | 12/1965 | Von Ardenne | 161—68 |
| 3,364,785 | 1/1968 | Geller | 74—552 |

LEO FRIAGLIA, Primary Examiner

R. R. SONG, Assistant Examiner

U.S. Cl. X.R.
74—552; 161—404